United States Patent
Schulz et al.

(10) Patent No.: US 7,622,877 B2
(45) Date of Patent: Nov. 24, 2009

(54) METHOD AND SYSTEM FOR CONTROLLING PERMANENT MAGNET AC MACHINES

(75) Inventors: Steven E. Schulz, Torrance, CA (US);
Silva Hiti, Redondo Beach, CA (US);
Khwaja M. Rahman, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 288 days.

(21) Appl. No.: 11/685,722

(22) Filed: Mar. 13, 2007

(65) Prior Publication Data

US 2008/0224651 A1   Sep. 18, 2008

(51) Int. Cl.
*H02P 7/00*   (2006.01)

(52) U.S. Cl. .................. 318/432; 318/430; 318/434; 318/700; 318/801

(58) Field of Classification Search ........... 318/807, 318/801, 432, 434, 812, 140, 244, 254.1, 318/430, 700, 800
See application file for complete search history.

(56) References Cited

U.S. PATENT DOCUMENTS

| | | | | |
|---|---|---|---|---|
| 5,656,911 | A * | 8/1997 | Nakayama et al. | 318/718 |
| 5,670,854 | A * | 9/1997 | Matsuura et al. | 318/432 |
| 6,690,137 | B2 * | 2/2004 | Iwaji et al. | 318/700 |
| 6,801,011 | B2 * | 10/2004 | Ide | 318/700 |
| 6,850,031 | B2 * | 2/2005 | Nakata et al. | 318/801 |
| 6,864,662 | B2 * | 3/2005 | Recker | 318/807 |
| 6,924,617 | B2 * | 8/2005 | Schulz et al. | 318/701 |
| 6,927,551 | B2 * | 8/2005 | Yoshimoto | 318/715 |
| 6,965,212 | B1 * | 11/2005 | Wang et al. | 318/700 |
| 7,015,667 | B2 * | 3/2006 | Patel et al. | 318/432 |
| 7,064,514 | B2 * | 6/2006 | Iwaji et al. | 318/801 |
| 7,242,163 | B2 * | 7/2007 | Gallegos-Lopez et al. | 318/812 |
| 7,294,988 | B2 * | 11/2007 | Ajima et al. | 318/712 |
| 7,388,340 | B2 * | 6/2008 | Nojima | 318/400.02 |
| 7,474,067 | B2 * | 1/2009 | Ueda et al. | 318/432 |
| 2005/0035676 | A1 * | 2/2005 | Rahman et al. | 310/83 |
| 2005/0168186 | A1 * | 8/2005 | Matsubara et al. | 318/575 |
| 2006/0066275 | A1 * | 3/2006 | Thunes et al. | 318/432 |

* cited by examiner

*Primary Examiner*—Bentsu Ro
*Assistant Examiner*—Antony M Paul (57) ABSTRACT

Methods and systems are provided for controlling permanent magnet machines under varying loads. The method comprises generating a d-axis voltage command and a q-axis voltage command, producing a modified d-axis current command based on the q-axis voltage command and a d-axis current command, converting the modified d-axis current command to a modified d-axis voltage command, and transmitting the modified d-axis voltage command and the q-axis voltage command to the PM machine. The d-axis voltage command is based on a d-axis current command.

20 Claims, 5 Drawing Sheets

METHOD AND SYSTEM FOR CONTROLLING PERMANENT MAGNET AC MACHINES

TECHNICAL FIELD

The present invention generally relates to controlling alternating current (AC) machines, and more particularly relates to systems and methods for controlling permanent magnet machines.

BACKGROUND OF THE INVENTION

In permanent magnet (PM) type machines, the presence of the magnet generates a magnetic flux, even when lacking a stator current. This flux typically results in a back electromotive force (EMF) that is proportional to the motor speed and that may increase beyond a direct current (DC) bus voltage. For example, the phase voltage of a PM machine increases as the velocity of the machine is increased. Above a predetermined velocity, the peak line-to-line voltage of the PM machine becomes greater than the bus voltage. To retain current control of the PM machine, the back EMF is generally reduced using field-weakening. A variety of field-weakening techniques are available, and the selection of a particular field-weakening technique may be based on the characteristics of the PM machine (e.g., a surface mount PM type machine, an interior PM type machine, or the like) and/or the requirements of the overall system.

In PM machines, a demagnetizing current is typically applied to reduce the magnet or total flux of the PM machine. Currently, d-axis current control techniques have been used to field-weaken the back EMF in strong magnet flux PM machines. For example, a negative d-axis current may be applied to produce a demagnetizing flux component that reduces the d-axis flux and the back EMF. These d-axis current control techniques have limited success with weak flux PM machines due to the weak influence of the d-axis current on the machine voltage. For example, in the non-linear over-modulation region of operation, the low influence of the d-axis current on the total machine flux may impair field-weakened operation of a weak flux PM machine. Additionally, under a large demagnetizing current, the d-axis flux may reverse polarity for some PM machines. In this case, increasing the negative d-axis current can cause instability by increasing the total voltage magnitude instead of decreasing the same. Hence, d-axis current control may be inadequate for some PM machines that operate at a high velocity with a large demagnetizing current.

In one field-weakening technique, look-up tables are utilized to generate initial d- and q-axis current commands in a feed-forward manner. For example, the characteristics of the PM machine may be measured and used to develop a model that is used to determine efficiency-optimized control parameters. These control parameters are typically implemented as look-up tables for efficiency-optimized control of the machine. The control parameters may also be determined within the voltage and current limits. During an ideal operation, a feed-forward control using these control parameters is generally sufficient to provide stable control of the PM machine under steady state conditions.

In an ideal case, these feed-forward commands, when implemented and applied to an AC motor operating with load, will typically produce the desired stator voltage. At higher speeds and/or torques, the stator voltage can be large, and appropriate selection of the look-up tables may keep the stator voltage within the inverter voltage limits. To retain current control at high speeds, when the available voltage is limited, additional assistance may be needed especially during transient operations or in the event of a mismatch between the actual machine parameters and the measured parameters. Due to the presence of non-idealities, such as parameter variation (e.g., manufacturing tolerances, temperature, aging, etc.), the stator voltage tends to deviate from the desired value. Additionally, during dynamic operation, additional stator voltage may be desirable, which may not be provided by the steady-state commands of the look-up tables. A field-weakening voltage loop is typically used to correct the errors between the model and the actual machine parameters for a stable machine operation under load.

Accordingly, it is desirable to provide systems and methods for controlling PM machines that accomodate a variety of load conditions. Additionally, it is desirable to provide systems and methods for controlling PM machines during operation under no load or low load conditions that also provide fast dynamics and steady-state stability. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and system are provided for controlling a permanent magnet (PM) machine. In one embodiment, a method for controlling a PM machine is provided that comprises generating a d-axis voltage command and a q-axis voltage command, producing a modified d-axis current command based on the q-axis voltage command and the d-axis current command, converting the modified d-axis current command to a modified d-axis voltage command, and transmitting the modified d-axis voltage command and the q-axis voltage command to the PM machine. The d-axis voltage command is based on a d-axis current command.

In another embodiment, a method is provided for controlling a PM machine. The method comprises generating a d-axis voltage command and a q-axis voltage command, producing a modified q-axis voltage command based on a modified q-axis current command if a torque command is greater than or equal to a first torque value, and producing a modified d-axis voltage command based on the q-axis voltage command and a d-axis current command if the torque command is less than or equal to a second torque value. The d-axis voltage command is based on the d-axis current command, and the q-axis voltage command is based on a q-axis current command. Each of the d-axis current command and the q-axis current command are based on at least the torque command. The first torque value greater than the second torque value.

In another embodiment, a system for controlling a PM machine is provided comprising a regulator having an input configured to receive a d-axis current command and a q-axis current command and having an output configured to couple to the PM machine, and a first module having an input configured to receive the q-axis voltage command and having an output coupled to the input of the regulator. The regulator is configured to produce a d-axis voltage command based on the d-axis current command and a q-axis voltage command based on the q-axis current command. The first module is configured to produce a d-axis current correction based on the q-axis voltage command. The regulator is further configured to produce a modified d-axis voltage command based on the d-axis current correction and the d-axis current command.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

A system and method are provided for controlling a permanent magnet (PM) machine. In general, the system comprises a current control system having a feedback loop providing regulation of a stator voltage for light load or no load operating conditions of the PM machine. In an exemplary embodiment, the current control system comprises a current command source, a current regulator coupled to the current command source, and a field-weakening voltage control module coupled between an output and an input of the current regulator. The current regulator produces d- and q-axis voltage commands based on d- and q-axis current commands, as well as their respective measured currents. Under light load or no load operating conditions, the field-weakening voltage control module produces a current correction (e.g., a d-axis current correction) based on the q-axis voltage command for modifying the d-axis current command supplied to the current regulator, and thereby regulating the stator voltage in light load (e.g., about ten percent (10%) of a peak torque of the PM machine for a particular operation) or no load operating conditions. In another exemplary embodiment, the field-weakening voltage control module may be further configured to produce another feedback current (e.g., a q-axis current correction) for modifying the q-axis current command when operating the PM machine under other load conditions (e.g., greater than light load operating conditions). Field-weakening control may also be transitioned from the d-axis current at no loads or light loads to the q-axis current at all other loads.

Figure 1:
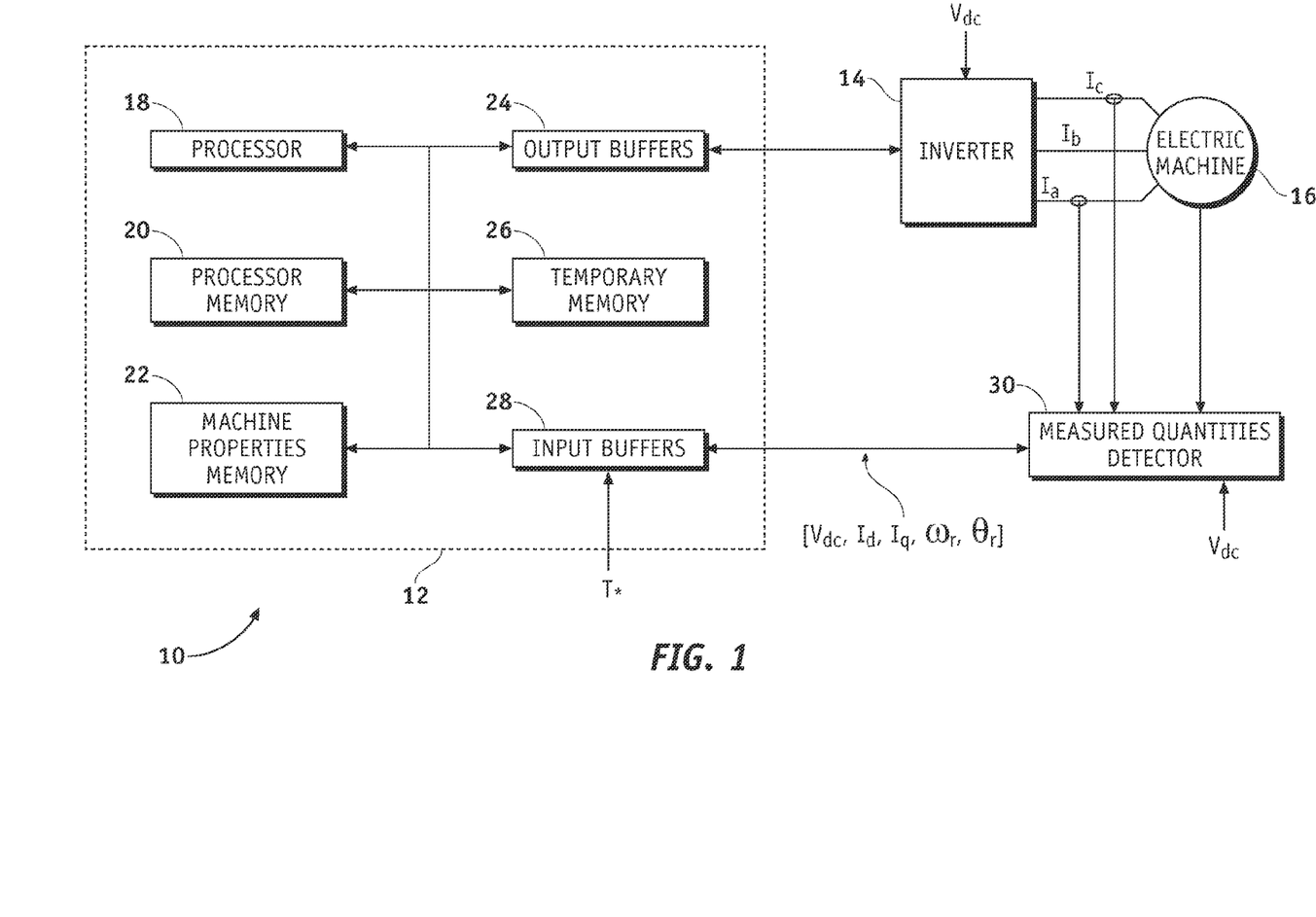
FIG. 1 is a block diagram of a drive system including a permanent magnet machine in accordance with an exemplary embodiment.

Referring to FIG. 1, a drive system 10 having a PM machine 16 (e.g., an electric machine) is shown in accordance with one embodiment. The drive system 10 comprises a controller 12, a voltage source inverter 14 coupled to the controller 12, the PM machine 16 coupled to the voltage source inverter 14, and a detector 30 having a first input coupled to the voltage source inverter 14, a second input coupled to the PM machine 16, and an output coupled to the controller 12 that supplies measured quantities of a variety of system outputs to the controller 12. The controller 12 produces duty cycle commands from the measured quantities and supplies the duty cycle commands to the voltage source inverter 14. Using the duty cycle commands, the voltage source inverter 14 produces three-phase AC voltages (e.g., $V_a$, $V_b$, $V_c$) from a supply potential (e.g., a battery potential or DC bus voltage ($V_{dc}$)) and drives the PM machine 16 with the three-phase voltages. The detector 30 acquires the measured quantities including, but not necessarily limited to, the supply voltage ($V_{dc}$), three measured phase currents (e.g., $I_a$, $I_b$, and $I_c$), although two measured currents may be enough for a Y-connected machine without a neutral, a rotor speed ($\omega_r$), and a rotor phase angle ($\theta_r$).

More specifically, the voltage source inverter 14 converts the supply voltage ($V_{dc}$) into the two- or three-phase currents to produce an AC voltage which is used to drive the PM machine 16. The voltage source inverter 14 can also vary the magnitude of the voltage applied to the PM machine 16, thus allowing the controller 12 to control the current generated by the PM machine. The magnitude of the voltage that the voltage source inverter 14 applies to the PM machine 16 is indicated by a modulation index. For example, a modulation index of zero indicates that the applied voltage is zero, and a modulation index of one indicates that the voltage source inverter 14 has applied the supply voltage to the PM machine (e.g., via a six-step operation). Between these modulation index values, the voltage source inverter 14 can apply varying voltages, such as by pulse width modulation (PWM). Generally, up to a percentage of the supply voltage (e.g., a modulation index of about 0.9069 or about 90.6% of the supply voltage), the voltage source inverter 14 controls the PM machine voltage in a substantially linear or linear manner. Beyond this percentage of the supply voltage (e.g., beyond the modulation index of about 0.9069), the voltage source inverter 14 operates in an over-modulation region where the control of the voltage is non-linear.

The controller 12 produces the duty cycle commands based at least in part on the quantities measured by the detector 30. The controller 12 comprises a processor 18, a processor memory 20, a machine properties memory 22, an input buffer 28, an output buffer 24, and a temporary memory 26 coupled to one another, although the controller 12 may have a variety of other configurations. The measured quantities are supplied to the input buffer 28 and may be stored in the machine properties memory, processor memory, or temporary memory 26 during operation of the controller 12. In an exemplary embodiment, the controller 12 executes one or more programs (e.g., to optimize current commands for a predetermined control parameter, to account for over-modulation region operation of the PM machine, and the like) to produce any precursor elements (e.g., modified current commands, voltage commands, and the like) used in determining the duty cycle commands.

Figure 2:
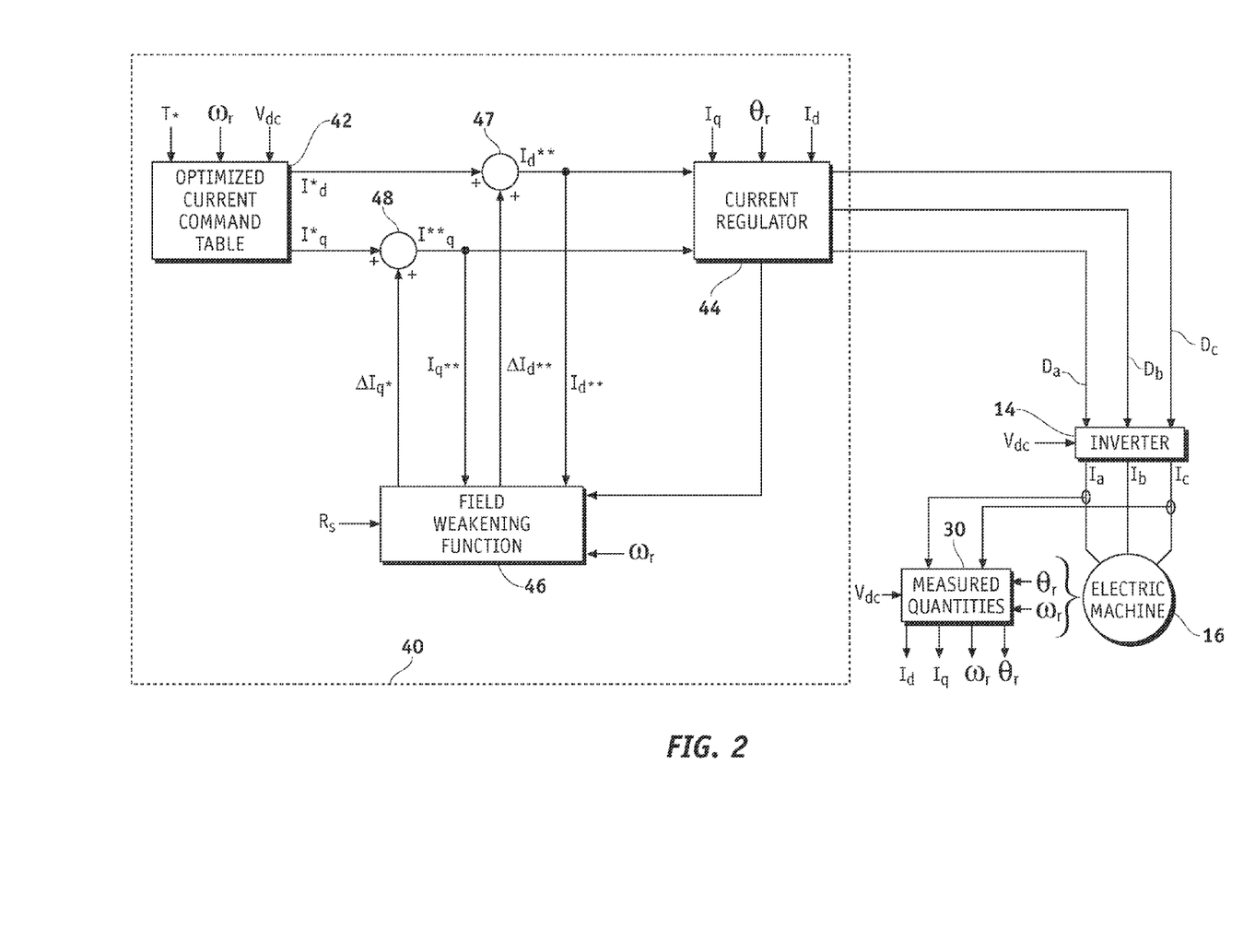
FIG. 2 is a block diagram of a current control system in accordance with an exemplary embodiment.

FIG. 2 is a block diagram illustrating a current control system 40 in accordance with an exemplary embodiment. The current control system 40 is implemented by the controller 12 shown in FIG. 1. One or more of the components of the current control system 40 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

Generally, the current control system 40 comprises a current command table 42, d-axis current command summing block 47 and q-axis current command summing block 48, each having a first input coupled to the current command table 42, a current regulator 44 having a first input coupled to an output of the summing block 47 and having a second input coupled to an output of the summing block 48, and a field-weakening module 46 having a first input coupled to an output of the current regulator 44, second and third inputs coupled to the outputs of summing blocks 47 and 48, respectively, a first output coupled to a second input of summing block 47, and a second output coupled to a second input of summing block 48.

Optimized current commands (e.g., a d-axis current command ($I^*_d$) and a q-axis current command ($I^*_q$)) are produced by the current command table 42. The current command table 42 may be optimized for a predetermined control parameter (e.g., system efficiency). Referring to FIGS. 1 and 2, the current command table 42 may be stored (e.g., as a look-up table) in the processor memory 20 and may be derived from any number of models for optimizing a desired control parameter. Voltage and current limits of the PM machine 16 may be used to apply appropriate d- and q-axis currents to the PM machine 16 to produce a desired output of the eIPM machine 16 (e.g., a desired torque). For a particular torque command ($T^*$), rotor speed ($\omega_r$), and the supply potential ($V_{dc}$), such as collected by the detector 30 and supplied to the controller 12, the optimized d-axis current command ($I^*_d$) and q-axis current command ($I^*_q$) are determined from the current command table 42.

The field-weakening module 46 produces one or more current corrections (e.g., $\Delta I^*_d$, $\Delta I^*_q$, or both $\Delta I^*_d$ and $\Delta I^*_q$) for potential modification of one or more of the current commands via the summing blocks 47, 48. For example, the field-weakening module 46 produces a current correction ($\Delta I^*_d$) to modify the d-axis current command (if necessary), via the summing block 47 for light load (e.g., about ten percent (10%) of a peak torque of the PM machine 16 for a particular operation) or no load operating conditions of the PM machine 16. The field-weakening module 46 may also produce another current correction ($\Delta I^*_q$) to modify the q-axis current command (if necessary), via the summing block 48 for all other load operating conditions of the PM machine 16 (e.g., greater than about ten percent (10%) of a peak torque of the PM machine 16 for a particular operation). In a transition region between the light load operating condition and the load operating condition, the field-weakening module 46 may produce both current corrections ($\Delta I^*_d$ and $\Delta I^*_q$) to modify both of the d- and q-axis current commands.

To produce a d-axis feedback current ($\Delta I^*_d$), the field-weakening module 46 samples a synchronous frame q-axis voltage command ($U^*_{sq}$), compares the synchronous frame q-axis voltage command ($U^*_{sq}$) with a synchronous frame q-axis voltage reference ($U_{sq}Ref$) to produce an error, converts the error to a current, and limits the current to negative current magnitudes to produce the d-axis current correction ($\Delta I^*_d$). This d-axis current correction ($\Delta I^*_d$) is summed with the d-axis current command ($I^*_d$) via the summing block 47 to produce the modified d-axis current command ($I^{**}_d$). In some cases (e.g., under ideal operation), the current correction ($\Delta I^*_d$) would be zero and no modification to the d-axis current command $I^*_d$ would be necessary because the current command table 42 is generated while working within the inverter voltage and current limits. However, in other cases, the current correction $\Delta I^*_d$ corrects errors between the actual machine parameters and the modeled machine parameters for no load or light load operating conditions.

To produce a q-axis current correction ($\Delta I^*_q$), the field-weakening module 46 samples the current commands (e.g., the optimized d-axis current command ($I^*_d$) and the modified q-axis current command ($I^{**}_q$)) supplied to the current regulator 44. Additionally, the field-weakening module 46 samples synchronous frame voltage commands ($U^*_{sd}$ and $U^*_{sq}$) produced in the current regulator 44. From the sampled current commands, the sampled synchronous frame voltage commands, the measured rotor speed ($\omega_r$), and a machine per phase resistance ($R_s$) of the PM machine 16, the field-weakening module 46 determines the current correction ($\Delta I^*_q$). Under ideal operation, the current correction ($\Delta I^*_q$) would be zero and no modification to the q-axis current command $I^*_q$ would be necessary since the current command table 42 is generated while working within the inverter voltage and current limits. However, in the non-ideal case, the current correction $\Delta I^*_q$ corrects errors between the actual machine parameters and the modeled machine parameters for load operating conditions.

The modified current command(s) (e.g., $I^{}_d$, $I^{}_q$, or both $I^{}_d$ and $I^{}_q$), current command(s) (e.g., $I^*_d$, $I^*_q$, or both $I^*_d$ and $I^*_q$), or a combination thereof are supplied to the current regulator 44. The current regulator 44 converts the current commands, modified or un-modified, and supplies duty cycle signals (e.g., $D_a$, $D_b$, and $D_c$) based on these current commands to the voltage source inverter 14 which in turn applies the appropriate voltage (e.g., three-phase voltages) to produce the commanded current for the PM machine 16.

Figure 3:
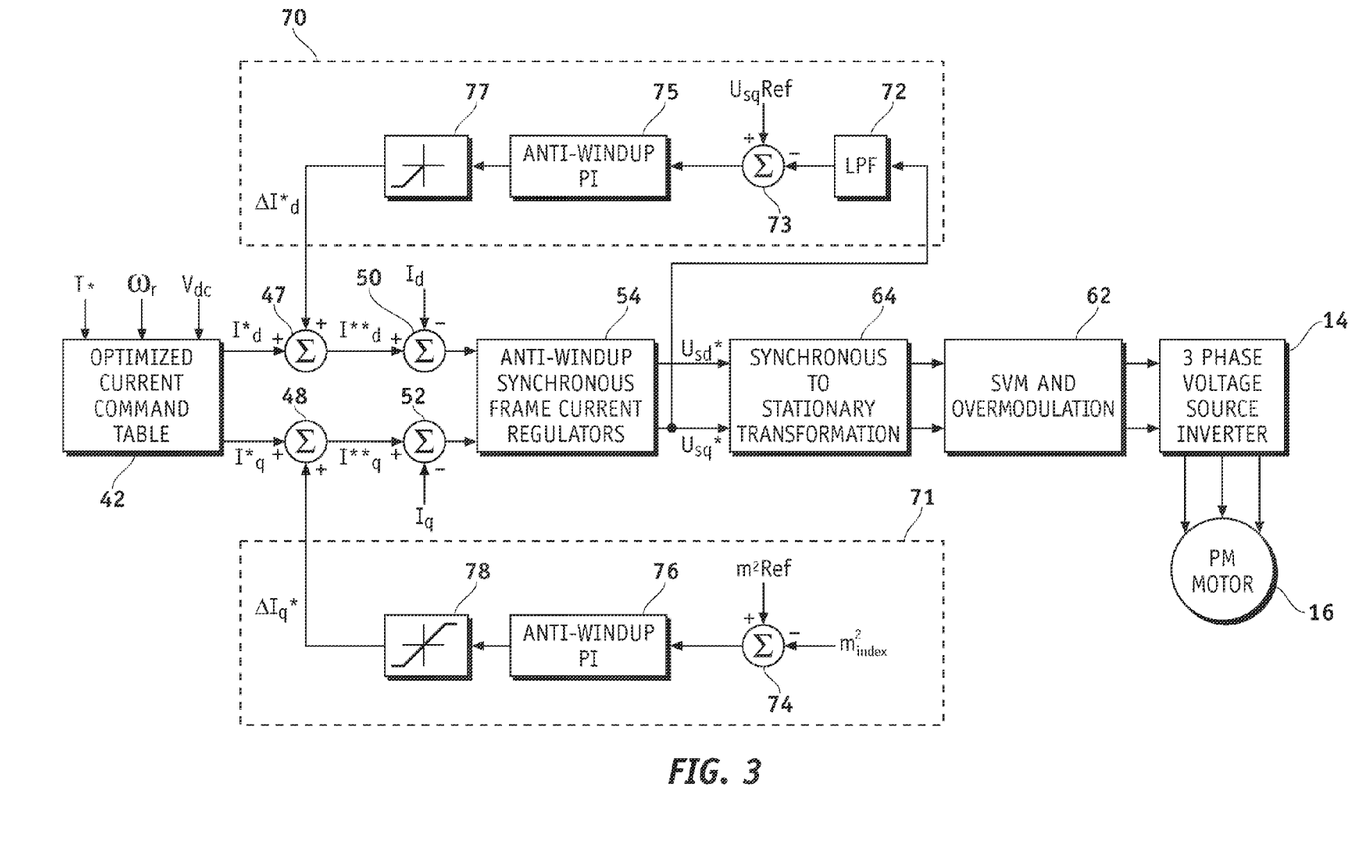
FIG. 3 is a block diagram illustrating in greater detail the current control system shown in FIG. 2.

FIG. 3 is a block diagram illustrating in greater detail the current control system 40 shown in FIG. 2. In this exemplary embodiment, the current control system 40 comprises summing blocks 47 and 48, a $\Delta I_d$ loop 70 having an output coupled to the summing block 47, a $\Delta I_q$ loop 71 having an output coupled to the summing block 48, a summing block 50 having an input coupled to an output of the summing block 47, a summing block 52 having an input coupled to an output of the summing block 48, an anti-windup synchronous frame current regulator 54 having an input coupled to an output of the summing block 50 and an output of the summing block 52, a transformation module 64 coupled to an output of the synchronous frame current regulator 54, and a Space Vector Modulation (SVM) and over-modulation module 62 coupled to an output of the transformation module 64. The SVM and over-modulation module 62 has an output coupled to the input of the voltage source inverter 14 and supplies stationary frame voltage commands based on the synchronous frame voltage commands (e.g., d- and q-axis) generated by the synchronous frame current regulator 54. The current control system 40 may include additional current regulators and summing blocks (e.g., adding a feed-forward term to improve the transient performance).

The $\Delta I_d$ loop 70 and $\Delta I_q$ loop 71 together form a field-weakening module, such as the field-weakening module 46 shown in FIG. 2, where the $\Delta I_d$ loop 70 produces the d-axis current correction ($\Delta I_d$), and the $\Delta I_q$ loop 71 produces the q-axis current correction ($\Delta I^*_q$). The $\Delta I_d$ loop 70 has an input coupled to the output of the synchronous frame current regulator 54 for sampling the synchronous frame q-axis voltage command ($U^*_{sq}$). The $\Delta I_d$ loop 70 comprises a low pass filter 72 having an input coupled to the output of the synchronous frame current regulator 54, a summing block 73 having an input coupled to an output of the low pass filter 72, an anti-windup proportional-integral (PI) regulator 75 having an input coupled to an output of the summing block 73, and a limiter 77 having an input coupled to an output of the PI regulator 75 and having an output coupled to the summing block 47. After filtering the synchronous frame q-axis voltage command ($U^*_{sq}$) from the synchronous frame voltage regulator 54, the summing block 73 produces an error from the difference between the synchronous frame q-axis voltage reference ($U_{sq}$Ref) and the synchronous frame q-axis voltage command ($U^*_{sq}$). The PI regulator 75 converts the error to a current, and the limiter 77 limits this current to negative current magnitudes to produce the d-axis current correction ($\Delta I^*_d$).

The steady-state stator voltage equations in the synchronous reference frame can be expressed as in Equations 1 and 2:

$$v_{ds}^e = R_s i_{ds}^e - \omega_r \lambda_{qs}^e \quad (1),$$

$$v_{qs}^e = R_s i_{qs}^e + \omega_r \lambda_{ds}^e \quad (2),$$

where $v_{qs}^e$ is the q-axis stator voltage component, $v_{ds}^e$ is the d-axis stator voltage component, $R_s$ is the stator resistance, $i_{qs}^e$ is the q-axis stator current component, $i_{ds}^e$ is the d-axis stator current component, $\omega_r$ is the measured rotor speed, $\lambda_{qs}^e$ is the q-axis flux linkage, and $\lambda_{ds}^e$ is the d-axis flux linkage, where the superscript "e" refers to the excitation or synchronous reference frame. The flux linkages can be further expanded as:

$$\lambda_{ds}^e = L_d i_{ds}^e + \lambda_{PM} \quad (3),$$

$$\lambda_{qs}^e = L_q i_{qs}^e \quad (4),$$

where $L_d$ is a d-axis inductance component, $L_q$ is a q-axis inductance component, and $\lambda_{PM}$ is flux linkage of the permanent magnet.

From Equations 1-4, the d-axis voltage approaches zero as the load approaches toward zero. Under the light load operating conditions, the total stator voltage is composed mostly of the q-axis stator voltage component ($v_{qs}^e$). Under no load operating conditions, the stator voltage may be controlled using the d-axis current command ($I^*_d$). Hence, the q-axis stator voltage ($v_{qs}^e$) is regulated via modification of the d-axis current command using the $\Delta I_d$ loop 70.

The q-axis output of the synchronous frame current regulator 54, ($U^*_{sq}$) is passed through the low pass filter 72, which filters out noise that may be passed from the sampled current directly through the proportional (P) term of the synchronous frame current regulator 54. After filtering, the output of the low pass filter 72 is compared to a reference ($U_{sq}$Ref). An error (e.g., the difference between $U_{sq}$Ref and $U^*_{sq}$) is fed to the anti-windup PI regulator 75. The output of the PI regulator 75 is confined to negative values by the limiter 77. The output of the limiter 77 ($\Delta I^*_d$) is added to the d-axis current command ($I^*_d$). Hence, this feedback loop increases the negative magnitude of the d-axis current command which in turn lowers the d-axis flux and q-axis voltage.

The $\Delta I_q$ loop 71 comprises a summing block 74, a PI regulator 76 having an input coupled to an output of the summing block 74, and a limiter 78 having an input coupled to an output of the PI regulator 76 and having an output coupled to the summing block 48. The summing block 74 produces an error from the difference between the square of the modulation reference ($M_{ref}$) and the square of the modulation index ($M_{index}$). The PI regulator 76 produces the q-axis feedback current for matching the modulation index ($M_{index}$) with the modulation reference ($M_{ref}$), and the limiter 78 establishes the upper and lower limits (e.g., the positive saturation limit ($I^{pos}_{quat}$) and the negative saturation limit ($I^{neg}_{quat}$)) for the feedback current ($\Delta I^*_q$). The output ($\Delta I^*_q$) of the limiter 78 is added to the q-axis current command ($\Delta I^*_q$). Hence, this feedback loop regulates the q-axis current command to allow the current control system 40 to operate in, but not necessarily limited to, a non-linear over-modulation region without the loss of current regulation.

The summing block 50 receives the modified d-axis current command ($I^{}_d$) from the summing block 47 and subtracts a measured d-axis current ($I_d$) from the modified d-axis current command ($I^{}_d$) to produce a d-axis current error. The summing block 52 receives the modified q-axis current command ($I^{}_q$) and subtracts a measured q-axis current ($I_q$) from the modified q-axis current command ($I^{}_q$) to produce a q-axis current error. The d- and q-axis current errors are supplied to the anti-windup current regulator 54 which converts the current errors to synchronous frame voltage commands (e.g., d- and q-axis synchronous frame voltage commands, respectively). The transformation module 64 converts the synchronous frame voltage commands ($U^*_{sd}$ and $U^*_{sq}$) received from the current regulator 54 to stationary frame voltage commands, and the over-modulation module 62 implements a control algorithm that accounts for the non-linear control of the synchronous frame voltage commands. In the voltage source inverter 14, the width or duty cycle of the signals are determined from the stationary frame voltage commands using PWM, which establishes the voltage magnitude applied to the PM machine 16.

In an exemplary embodiment, the limiters 77 and 78 limit the output of the $\Delta I_d$ loop 70 and the $\Delta I_q$ loop 71, respectively, as a function of the torque command, which is an indication of the amount of load demanded from the PM machine 16. The $\Delta I_d$ loop 70 preferably modifies the d-axis current command ($I^*_d$) when the PM machine 16 is operating under no load or low load. Low load conditions are about ten percent (10%) of the peak torque demanded from the PM machine 16 for a particular operation. The $\Delta I_q$ loop 71 preferably modifies the q-axis current command ($I^*_q$) when the PM machine 16 is operating under all other loads. In another embodiment, the limiters 77 and 78 are configured to transition between the operation of the $\Delta I_d$ loop 70 and the $\Delta I_q$ loop 71 as a function of the torque command.

Figure 4:
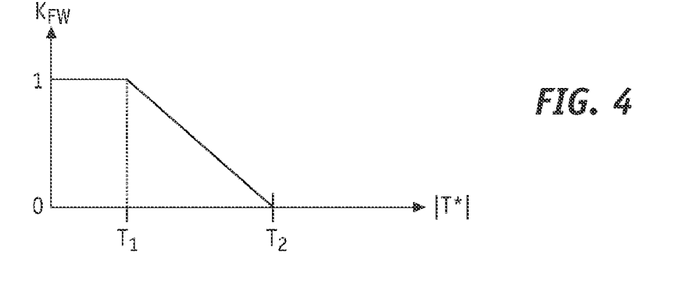
FIG. 4 is a plot of a scaling factor versus a torque command in accordance with an exemplary embodiment.

FIG. 4 is a plot of a scaling factor ($K_{FW}$) versus the absolute value of a torque command (T*) in accordance with an exemplary embodiment. Referring to FIGS. 3 and 4, the $\Delta I_d$ loop 70 is activated under light load or no load conditions as a function of the torque command (T*). The scaling factor ($K_{FW}$) is a function of the torque command (T*). Below a second torque value ($T_1$), the scaling factor is about unity. Between the second torque value ($T_1$) and a second torque value ($T_2$), the scaling factor is reduced to zero in a substantially linear manner. The torque values ($T_1$ and $T_2$) may be selected based on a peak torque expected from the PM machine 16 for a given operating condition. For example, the first or second torque values may be selected to be about ten percent (10%) of the peak torque expected from the PM machine 16.

The limits on the anti-windup PI regulator 75 are given by Equations 5 and 6:

$$N\lim_{\Delta Id} = K_{FW} \cdot N\lim_{\Delta Id\_Nom} \quad (5),$$

$$P\lim_{\Delta Id} = 0 \quad (6),$$

where $N\lim_{\Delta Id}$ is the negative limit, $N\lim_{\Delta Id\_Nom}$ is a negative number, and $P\lim_{\Delta Id}$ is the positive limit.

Additionally, the same scaling factor is utilized to disable the $\Delta I_q$ loop 71 at light loads, as seen in Equation 4 where the limits on the anti-windup PI regulator 76 are given as:

$$N\lim_{\Delta Iq} = (1-K_{FW}) \cdot N\lim_{\Delta Iq\_Nom} \quad (7),$$

$$P\lim_{\Delta Iq} = (1-K_{FW}) \cdot P\lim_{\Delta Iq\_Nom} \quad (8),$$

where $N\lim_{\Delta Iq}$ is the negative limit, $N\lim_{\Delta Iq\_Nom}$ is a negative number, $P\lim_{\Delta Iq\_Nom}$ is a positive number, and $P\lim_{\Delta Iq}$ is the positive limit. In this manner, the field-weakening control can be transitioned from the d-axis current at light loads, or no load, to the q-axis current at all other loads. Hence, the $\Delta I_d$ loop 70 is the activated feedback mechanism when the torque command is less than $T_1$. Between $T_1$ and $T_2$, the limits on the regulators 75 and 76 are adjusted with respect to torque in a substantially linear manner. At torque commands exceeding $T_2$, the $\Delta I_d$ loop 70 is disabled, and the $\Delta I_q$ loop 71 is activated to provide the feedback. Although the limits on the regulators 75 and 76 are linearly adjusted with respect to torque between $T_1$ and $T_2$, other non-linear adjustments may be used.

Figure 5:
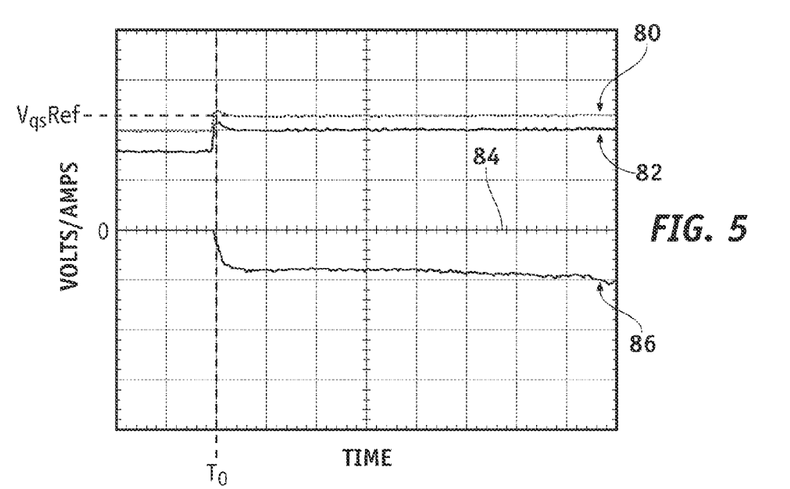
FIG. 5 is a plot of current corrections and voltage signals of the current control system versus time illustrating no load operation of the drive system shown in FIG. 1 in accordance with an exemplary embodiment.

FIG. 5 is a plot of current corrections and voltage signals of the current control system 40 versus time illustrating a no load operation of the drive system 10 shown in FIG. 1 in accordance with an exemplary embodiment. The synchronous frame q-axis voltage command $(U^*_{sq})$ 80, the square of the modulation index 82, the q-axis current correction $(\Delta I^*_q)$ 84, and the d-axis current correction $(\Delta I^*_d)$ 86 are shown over time. Prior to time $T_0$, the drive system 10 operates at a maximum speed with no load and with a predetermined d-axis current command. At time $T_0$, the drive system 10 operates at the maximum speed but with no load and the d-axis current command is step-wise decreased (e.g., from about 1.0 to about 0.8). As a result, the synchronous frame q-axis voltage command $(U^*_{sq})$ 80 increases to a predetermined reference value $(U_{sq}Ref)$ (e.g., 95% of a six-step technique). The $\Delta I_d$ loop 70 activates at time $T_0$ and regulates the q-axis voltage at the reference value by increasing the negative magnitude of the d-axis current (e.g., shown by the increased d-axis current correction 86). This shows that the q-axis voltage is regulated and has dynamic response even though the q-axis current correction remains zero.

Figure 6:
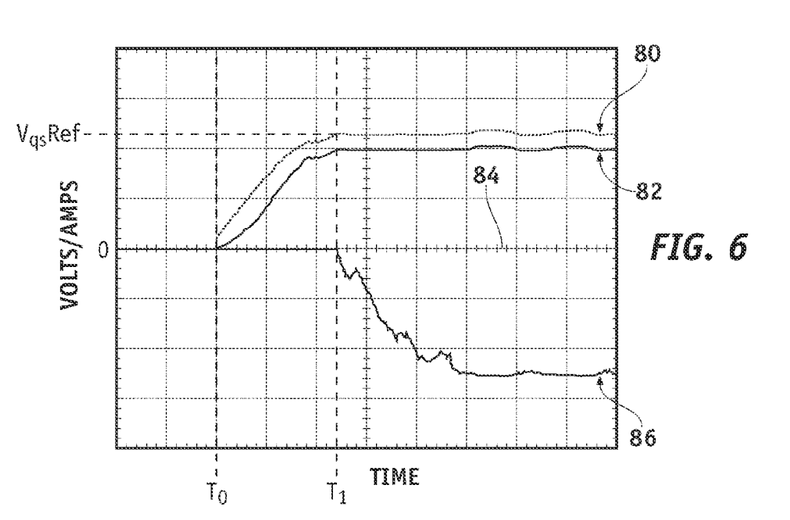
FIG. 6 is a plot of the current corrections and voltage signals of the current control system versus time illustrating a no load acceleration in accordance with an exemplary embodiment.

FIG. 6 is a plot of current corrections and voltage signals of the current control system 40 versus time illustrating a no load acceleration in accordance with an exemplary embodiment. The synchronous frame q-axis voltage command $(U^*_{sq})$ 80, the square of the modulation index 82, the q-axis feedback current $(\Delta I^*_q)$ 84, and the d-axis feedback current $(\Delta I^*_d)$ 86 are shown over time. Prior to time $T_0$, the drive system 10 operates at zero speed. The PM motor 16 is accelerated at time $T_0$ (e.g., from 0 rpm to 10 krpm at 2000 rpm/sec) with no load. The synchronous frame q-axis voltage command $(U^*_{sq})$ increases to the predetermined reference value $(U_{sq}Ref)$ (e.g., 95% of a six-step technique). At time $T_1$, the $\Delta I_d$ loop 70 activates and regulates the q-axis voltage at the reference value $(U_{sq}Ref)$.

Figure 7:
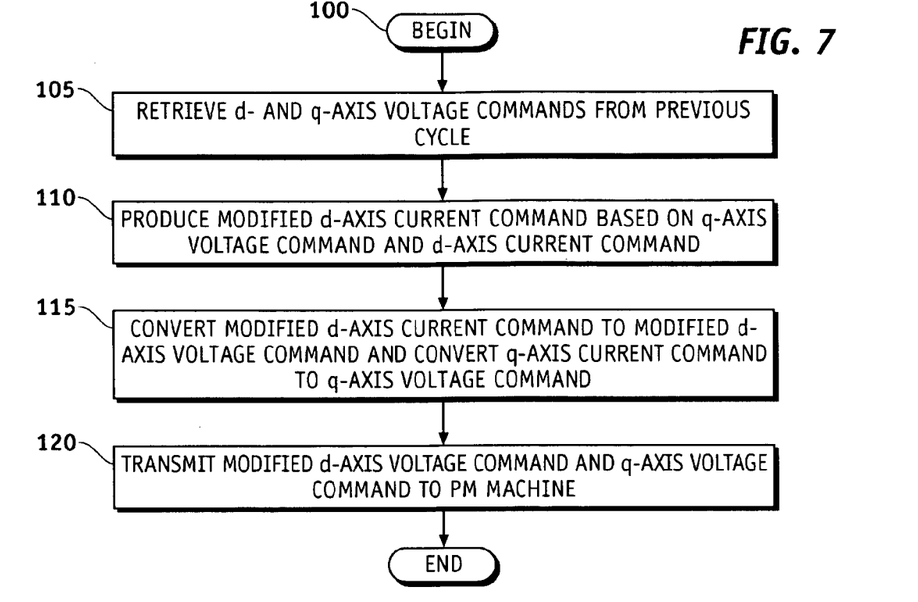
FIG. 7 is a flow diagram of a method for controlling a permanent magnet machine in accordance with an exemplary embodiment.

FIG. 7 is a flow diagram of a method 100 for controlling a PM machine in accordance with an exemplary embodiment. The PM machine is configured to operate with a low load (e.g., associated with about 10% of a peak torque of the PM machine) or without load. Referring to FIGS. 3 and 7, a d-axis voltage command (e.g., $U^*_{sd}$) and a q-axis voltage command (e.g., $U^*_{sq}$) are retrieved from computations performed in a previous cycle, as indicated at step 105. The d-axis voltage command is based on a d-axis current command (e.g., $I^*_d$). For example, the anti-windup synchronous frame current regulator 54 produces the d- and q-axis voltage commands based on the d- and q-axis current commands, respectively.

A modified d-axis current command (e.g., $I^{}_d$) is produced based on the q-axis voltage command and the d-axis current command, as indicated at step 110**. The modified d-axis current command is preferably produced if the PM machine is operating with low load or without load (e.g., if the PM machine is operating with a load based on less than or equal to about 10% of the peak torque of the PM machine). In one exemplary embodiment, a current correction (e.g., $\Delta I^*_d$) is produced from the q-axis voltage command, and the current correction is summed (e.g., via summing block 47) with the d-axis current command to produce the modified d-axis current command. To produce the current correction, the q-axis voltage command may be compared (e.g., via summing block 73) with a reference voltage (e.g., $U_{sq}Ref$) to produce an error. The error is then converted (e.g., via the anti-windup PI regulator 75) to a current and negatively limited (e.g., via the limiter 77) to produce the current correction.

The modified d-axis current command is converted (e.g., via anti-windup synchronous frame current regulator 54) to a modified d-axis voltage command, as indicated at step 115. Additionally, the q-axis current command is converted to a q-axis voltage command. The modified d-axis voltage command and the q-axis voltage command are transmitted to the PM machine, as indicated at step 120. The d-axis current command and the q-axis current command may be generated from at least one of a torque command $(T^*)$, a rotor speed $(\omega_r)$ of the PM machine, and a supply voltage $V_{DC}$. For example, $I^*_d$ and $I^*_q$ are supplied by the current command table 42.

Figure 8:
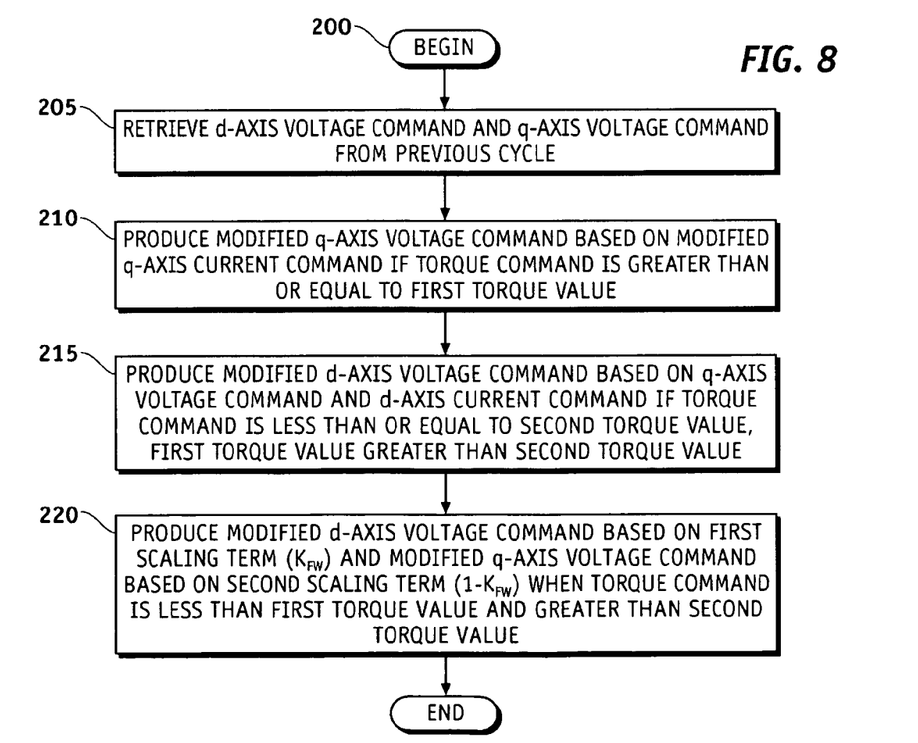
FIG. 8 is a flow diagram of a method for controlling a permanent magnet machine in accordance with another exemplary embodiment.

FIG. 8 is a flow diagram of a method 200 for controlling a PM machine in accordance with another exemplary embodiment. The PM machine is configured to operate based on the torque command $(T^*)$, the d-axis current command $(I^*_d)$, and the q-axis current command $(I^*_q)$. Referring to FIGS. 3 and 8, a d-axis voltage command (e.g., $U^*_{sd}$) and a q-axis voltage command (e.g., $U^*_{sq}$) are retrieved from the previous computation cycle, as indicated at step 205. The d-axis voltage command is based on the d-axis current command, and the q-axis voltage command is based on the q-axis current command, as well as their respective measured currents. Each of the d-axis current command and the q-axis current command are at least based on the torque command. A modified q-axis voltage command is produced based on a modified q-axis current command $(I^{**}_q)$ if the torque command $(T^*)$ is greater than or equal to a first torque value (e.g., $T_2$), as indicated at step 210. A modified d-axis voltage command is produced based on the q-axis voltage command and the d-axis current command if the torque command $(T^*)$ is less than or equal to a second torque value (e.g., $T_1$), as indicated at step 215. The first torque value is greater than the second torque value. The modified d-axis voltage command may be produced based on the q-axis voltage command and the d-axis current command if the PM machine is operating with a load less than or equal to about 10% of the peak torque of the PM machine.

The modified q-axis voltage command and the d-axis voltage command are transmitted if the torque command $(T^*)$ is greater than the first torque value $(T_2)$. The modified d-axis voltage command and the q-axis voltage command are transmitted if the torque command $(T^*)$ is less than a second torque value $(T_1)$. A modified d-axis voltage command may be produced based on a first scaling term $(K_{FW})$ and a modified q-axis voltage command may be produced based on a second scaling term $(1-K_{FW})$ if the torque command $(T^*)$ is less than the first torque value ($T_2$) and greater than the second torque value ($T_1$), wherein $K_{FW}$ varies from 0 to 1 in a substantially linear manner as the torque command ($T^*$) varies from the first torque value ($T_2$) to the second torque value ($T_1$). To produce the modified d-axis voltage command and the modified q-axis voltage command, an error is produced from a sum of a q-axis reference potential and the q-axis voltage command. This error is converted (e.g., via the anti-windup PI regulator 75) to a current and negatively limited (e.g., via the limiter 77) based on the first scaling term ($K_{FW}$) to produce a d-axis current correction. The d-axis feedback current is summed (e.g., via the summing block 47) with the d-axis current command to produce the modified d-axis current command, and the modified d-axis current command is converted to the modified d-axis voltage command.

In another embodiment, a q-axis current correction may be produced based on the modulation reference (e.g., a square of modulation reference (mRef)) and the modulation index (e.g., a square of modulation index ($m_{index}$)) of the PM machine. For example, a difference between the square of the modulation reference (mRef) and the square of the modulation index ($m_{index}$) is converted to a current (e.g., via the anti-windup PI regulator 76) and then limited (e.g., via the limiter 78) based on a scaling term ($1-K_{FW}$) to produce the q-axis current correction. The q-axis current correction is summed (e.g., via the summing block 48) with the q-axis current command to produce the modified q-axis current command, and the modified q-axis current command is converted to the modified q-axis voltage command. In another embodiment, the modified d-axis voltage command is produced based on the first scaling term ($K_{FW}$) and the modified q-axis voltage command is produced based on the second scaling term ($1-K_{FW}$) if the PM machine is operating with a load less than or equal to about 10% of the peak torque of the PM machine and greater than the second torque value ($T_1$).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a permanent magnet (PM) machine, wherein the PM machine is configured to operate with a low load or without a load, the method comprising the steps of:
    generating a d-axis voltage command and a q-axis voltage command, the d-axis voltage command based on a d-axis current command;
    producing a modified d-axis current command based on the q-axis voltage command and the d-axis current command when the PM machine is operating with the low load or without the load;
    converting the modified d-axis current command to a modified d-axis voltage command; and
    transmitting the modified d-axis voltage command and the q-axis voltage command to the PM machine.

2. A method according to claim 1, wherein said step of producing a modified d-axis current command comprises:
    producing a current correction from the q-axis voltage command; and
    summing the current correction with the d-axis current command to produce the modified d-axis current command.

3. A method according to claim 2, wherein said step of producing a current correction comprises:
    comparing the q-axis voltage command with a reference voltage to produce an error;
    converting the error to a current; and
    negatively limiting the current to produce the current correction.

4. A method according to claim 2, further comprising generating the d-axis current command and a q-axis current command from at least one of a torque command, a rotor speed of the PM machine, and a supply voltage.

5. A method according to claim 1, further comprising the step of producing a modified q-axis current command if the PM machine is operating with a load greater than the low load.

6. A method for controlling a permanent magnet (PM) machine, the method comprising the steps of:
    generating a d-axis voltage command and a g-axis voltage command, the d-axis voltage command based on a d-axis current command;
    producing a modified d-axis current command based on the g-axis voltage command and the d-axis current command;
    converting the modified d-axis current command to a modified d-axis voltage command; and
    transmitting the modified d-axis voltage command and the g-axis voltage command to the PM machine;
    wherein the PM machine has a peak torque; and wherein said step of producing a modified d-axis current command comprises producing the modified d-axis current command based on the q-axis voltage command and the d-axis current command if the PM machine is operating with a load less than or equal to about 10% of the peak torque of the PM machine.

7. A method for controlling a permanent magnet (PM) machine, the PM machine configured to operate based on a torque command, a d-axis current command, and a q-axis current command, the method comprising the steps of:
    generating a d-axis voltage command and a q-axis voltage command, the d-axis voltage command based on the d-axis current command, the q-axis voltage command based on the q-axis current command, each of the d-axis current command and the q-axis current command based on at least the torque command;
    producing a modified q-axis voltage command based on a modified q-axis current command if the torque command is greater than or equal to a first torque value; and
    producing a modified d-axis voltage command based on the q-axis voltage command and the d-axis current command if the torque command is less than or equal to a second torque value, the first torque value greater than the second torque value.

8. A method according to claim 7, further comprising:
    transmitting the modified q-axis voltage command and the d-axis voltage command if the torque command is greater than the first torque value; and
    transmitting the modified d-axis voltage command and the q-axis voltage command if the torque command is less than a second torque value.

9. A method according to claim 7, further comprising producing a modified d-axis voltage command based on a first scaling term ($K_{FW}$) and a modified q-axis voltage command based on a second scaling term $(1-K_{FW})$ if the torque command is less than the first torque value and greater than the second torque value, wherein $K_{FW}$ varies linearly from 0 to 1 as the torque command varies from the first torque value to the second torque value.

10. A method according to claim 9, wherein said step of producing a modified d-axis voltage command based on a first scaling term $(K_{FW})$ and a modified q-axis voltage command based on a second scaling term $(1-K_{FW})$ comprises:
  producing an error from a sum of a q-axis reference potential and the q-axis voltage command;
  converting the error to a current;
  negatively limiting the current based on the first scaling term $(K_{FW})$ to produce a d-axis current correction;
  summing the d-axis current correction with the d-axis current command to produce a modified d-axis current command; and
  converting the modified d-axis current command to the modified d-axis voltage command.

11. A method according to claim 9, wherein the PM machine has a modulation reference and a modulation index; and wherein said step of producing a modified q-axis voltage command based on a first scaling term $(K_{FW})$ and a modified q-axis voltage command based on a second scaling term $(1-K_{FW})$ comprises:
  producing an error based on the modulation reference and the modulation index;
  limiting the error based on a scaling term $(1-K_{FW})$ to produce a q-axis current correction;
  summing the q-axis current correction with the q-axis current command to produce the modified q-axis current command; and
  converting the modified q-axis current command to the modified q-axis voltage command.

12. A method according to claim 9, wherein the PM machine has a peak torque; and wherein said step of producing a modified d-axis voltage command based on a first scaling term $(K_{FW})$ and a modified q-axis voltage command based on a second scaling term $(1-K_{FW})$ comprises producing the modified d-axis voltage command based on the first scaling term $(K_{FW})$ and the modified q-axis voltage command based on the second scaling term $(1-K_{FW})$ if the PM machine is operating with a load less than or equal to about 10% of the peak torque of the PM machine and greater than the second torque value.

13. A method according to claim 7, wherein the PM machine has a peak torque; and wherein said step of producing a modified d-axis voltage command comprises producing the modified d-axis voltage command based on the q-axis voltage command and the d-axis current command if the PM machine is operating with a load less than or equal to about boo of the peak torque of the PM machine.

14. A system for controlling a permanent magnet (PM) machine, wherein said PM machine is configured to operate with a modulation reference, a modulation index, and a torque command; the system comprising:
  a regulator having an input configured to receive a d-axis current command and a q-axis current command and having an output configured to couple to the PM machine, said regulator configured to produce a d-axis voltage command based on said d-axis current command and a q-axis voltage command based on said q-axis current command;
  a first module having an input configured to receive said q-axis voltage command and having an output coupled to said input of said regulator, said first module configured to produce a d-axis current correction based on said q-axis voltage command, said regulator further configured to produce a modified d-axis voltage command based on said d-axis current correction and said d-axis current command; and
  a second module coupled to said input of said regulator, said second module configured to produce a q-axis current correction when said torque command is greater than or equal to a first torque value, said q-axis current correction based on said modulation reference and said modulation index.

15. A system according to claim 14, wherein the PM machine has a peak torque; and wherein said first module is further configured to produce said d-axis current correction based on said q-axis voltage command if the PM machine is operating with a load based on less than or equal to about 10% of said peak torque of the PM machine.

16. A system for controlling a permanent magnet (PM) machine, the system comprising:
  a regulator having an input configured to receive a d-axis current command and a q-axis current command and having an output configured to couple to the PM machine, said regulator configured to produce a d-axis voltage command based on said d-axis current command and a q-axis voltage command based on said q-axis current command; and
  a first module having an input configured to receive said q-axis voltage command and having an output coupled to said input of said regulator, said first module configured to produce a d-axis current correction based on said q-axis voltage command, said regulator further configured to produce a modified d-axis voltage command based on said d-axis current correction and said d-axis current command;
  wherein said first module comprises:
    a low-pass filter having an input configured to receive said q-axis voltage command and having an output;
    a summing block having an input coupled to said output of said low-pass filter and having an output, said summing block configured to produce an error between a q-axis voltage reference and said q-axis voltage command;
    a proportional-integral (PI) controller having an input coupled to said output of said summing block and having an output, said PI controller configured to produce a current based on said error;
    a limiter having an input coupled to said output of said PT controller and having an output coupled to said input of said regulator, said limiter configured to negatively limit said current to produce said d-axis current correction.

17. A system for controlling a permanent magnet (PM) machine, wherein said PM machine is configured to operate with a modulation reference, a modulation index, and a torque command, the system comprising:
  a regulator having an input configured to receive a d-axis current command and a q-axis current command and having an output configured to couple to the PM machine, said regulator configured to produce a d-axis voltage command based on said d-axis current command and a q-axis voltage command based on said q-axis current command;
  a first module having an input configured to receive said q-axis voltage command and having an output coupled to said input of said regulator, said first module configured to produce a d-axis current correction based on said q-axis voltage command, said regulator further configured to produce a modified d-axis voltage command based on said d-axis current correction and said d-axis current command; and a second module coupled to said input of said regulator, said second module configured to produce a q-axis current correction if said torque command is greater than or equal to a first torque value, said q-axis current correction based on said modulation reference and said modulation index;

wherein said first module is further configured to produce said d-axis current correction if said torque command is less than or equal to a second torque value, said first torque value greater than said second torque value; and wherein said regulator is further configured to produce a modified q-axis voltage command based on said q-axis current correction and said q-axis current command.

18. A system according to claim 17, wherein said second module comprises:

a summing block configured to produce an error based on said modulation reference and said modulation index;

a PI controller having an input coupled to said summing block and having an output, said PI controller configured to produce a current based on said error; and a limiter having an input coupled to said output of said PI controller and having an output coupled to said input of said regulator, said limiter configured to limit said current to produce said d-axis current correction.

19. A system according to claim 17, wherein said first module is further configured to produce said modified d-axis voltage command based on a first scaling term ($K_{FW}$) if said torque command is less than said first torque value and greater than said second torque value, wherein $K_{FW}$ varies linearly from 0 to 1 as said torque command varies from said first torque value to said second torque value; and wherein said second module is further configured to produce said modified q-axis voltage command based on a second scaling term ($1-K_{FW}$) if said torque command is less than said first torque value and greater than said second torque value.

20. A system according to claim 19, wherein the PM machine has a peak torque;

wherein said first module is further configured to produce a modified d-axis current command based on said first scaling term ($K_{FW}$) if the PM machine is operating with a load based on less than or equal to about 10% of said peak torque of the PM machine and greater than said second torque value; and wherein said second module is further configured to produce a modified q-axis current command based on said second scaling term ($1-K_{FW}$) if the PM machine is operating with said load based on less than or equal to about 10% of said peak torque of the PM machine and greater than said second torque value.

* * * * *